Figures 1, 2, 3:
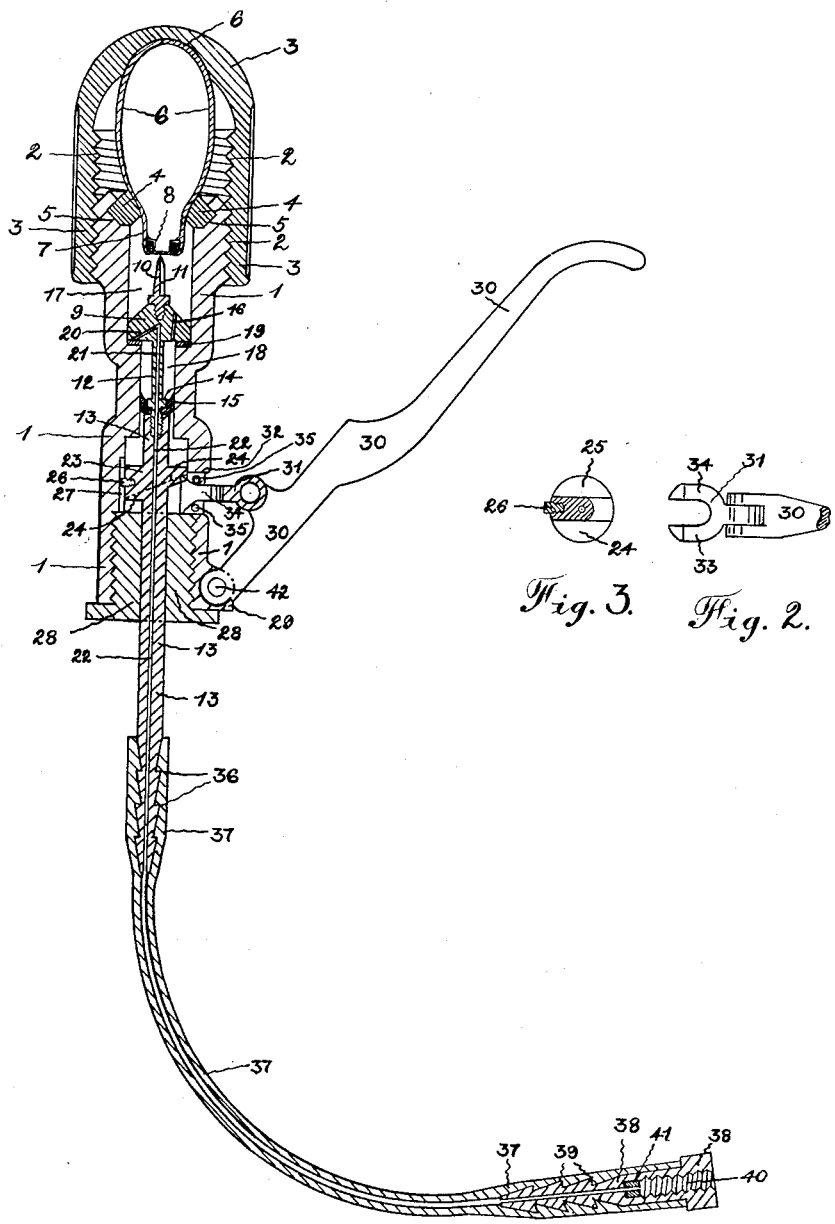

No. 805,474. PATENTED NOV. 28, 1905.
A. G. LAVERTINE & J. E. McNELLAN.
MEANS FOR INFLATING RUBBER TIRES.
APPLICATION FILED MAR. 6, 1905.

Witnesses: Inventors:
Alfonso George Lavertine
James Edward McNellan
by Chas. Ovendale,
their Attorney

UNITED STATES PATENT OFFICE.

ALFONSO GEORGE LAVERTINE AND JAMES EDWARD McNELLAN, OF JOHANNESBURG, TRANSVAAL.

MEANS FOR INFLATING RUBBER TIRES.

No. 805,474.

Specification of Letters Patent.

Patented Nov. 28, 1905.

Application filed March 6, 1905. Serial No. 248,632.

*To all whom it may concern:*

Be it known that we, ALFONSO GEORGE LAVERTINE and JAMES EDWARD McNELLAN, subjects of the King of Great Britain, residing at Johannesburg, Transvaal, have invented certain new and useful Improvements in Means for Inflating Rubber Tires, of which the following is a specification.

This invention relates to means for inflating rubber tires, and is especially designed for the inflation of the pneumatic tires of bicycles, tricycles, or motor-vehicles of any description equipped with inflatable tires.

The inflation of tires or the replenishing of the air or gas lost through leakage resulting from a puncture or other cause is by the pumps ordinarily employed for the purpose a lengthy and laborious operation; and the object of the present invention is to provide means whereby the operation of inflating or partially inflating the tire may be effected in a very simple, easy, and speedy manner.

According to our invention the inflation of a tire is effected by means of a cartridge or cartridges containing air or gas under pressure.

For the practical application of our invention we employ an instrument or device which is adapted to hold said cartridge and to release the compressed air or gas therefrom and to conduct it to the valve ordinarily provided on pneumatic tires. This device is preferably so constructed that the whole or any portion of the contents of a cartridge may be utilized for inflating the tire and the remainder be stored therein for future use.

The device as adapted for use for bicycles and the like is simple and compact in construction and of small size and is capable of being operated by one hand, leaving the other hand free to determine when the tire has been sufficiently inflated. As adapted for use for inflating the tires of motor-cars or similar vehicles it will be constructed of larger size and will preferably be equipped with a pressure-gage.

The metal cartridges forming the holders for the compressed air or gas intended for use with cycles need only be of small dimensions, so that a number may be conveniently carried, each one of which will preferably hold sufficient of the compressed air or gas to fully inflate one tire.

In order that our invention and a manner of carrying the same into effect may be readily comprehended, we attach hereto a sheet of drawings marked with characters of reference corresponding to the following description.

In the drawings, Figure 1 represents a sectional elevation of a contrivance adapted to release the compressed air or gas from the metal cartridge and to conduct it to the tire to be inflated. Fig. 2 is a plan of a portion of the lever and the sliding piece pivoted thereto, and Fig. 3 is a plan of the beveled or inclined enlargement.

In the construction of the device illustrated in the drawings a casing or body 1 is employed which at one extremity is formed with an external screw-thread 2. Over this extremity of the casing 1 is screwed a cap or cover 3, between the inner end of which and a rubber or other resilient ring 4, located in an annular recess 5 in the top of the casing 1, the metal cartridge 6 is placed. The cartridge 6 is shown of oval shape and formed with a neck 7, in which is fitted a seal 8, adapted to be perforated to release the compressed air or gas contained within the cartridge 6.

Inside the casing 1 is located a valve 9, in the upper end of which is fitted a needle 10, which serves for penetrating the seal 8, fitted in the neck 7 of the cartridge 6. This needle 10 is preferably formed with flutes or grooves 11, which allow the air or gas to escape after the needle 10 has perforated the seal 8. The valve 9 is formed with a stem 12, which is screwed into the inner end of a rod or tube 13. The stem 12 is formed with an annular projection or piston 14, round which is fitted a cup-leather or other suitable packing 15.

16 is a port formed through the valve 9, placing the chamber 17, in which the valve 9 is located, in communication with the passage 18, formed round the stem 12 above the cup-leather 15.

19 is a ring of rubber or other suitable resilient material which forms a seating for the valve 9, and 20 is a port communicating with a port 21, formed longitudinally of the stem 12, along which port 21 the compressed air or gas from the cartridge 6 passes to the tire to be inflated. The rod 13, into which the stem 12 of the valve 9 is screwed, is also formed with a longitudinal hole 22 in communication with the ports 20 and 21 in the valve 9 and stem 12, respectively.

On the rod 13 inside the lower portion of the casing 1 is formed an annular enlargement or boss 23, on which are formed two bevels or inclines 24 25. 26 is a screw or pin screwed into the boss 23, which is adapted to traverse a groove 27, formed inside the casing 1. 28 is a bush or cap screwed into the lower end of the casing 1 for closing the same and to form a guide for said rod 13. To a lug 29, formed on the end of the casing 1, is pivoted a lever 30. To this lever 30 is pivoted a bifurcated piece 31, which projects through a hole 32, formed in the casing 1, the prongs 33 34 of the bifurcation projecting to either side of the rod 13 and engaging the inclines 24 25, formed on the boss or enlargement 23.

35 represents two pins which form stops for the bifurcated piece 31 to prevent the prongs 33 34 being withdrawn from the casing 1.

The outer end of the rod 13 is formed with annular projections 36, which serve to secure the piece of rubber or other flexible tubing 37, provided for conducting the compressed air or gas from the casing 1 to the valve of the tire to be inflated. In the other end of said tube 37 is fitted a tubular piece 38, formed with annular projections 39 and with an internal screw-thread 40 to screw over the nipple of the valve of the tire.

41 is a resilient ring which forms an air-tight joint with the nipple of the valve of the tire to be inflated.

To bring the device into use, the cap 3 is unscrewed and the cartridge 6 placed in position in the ring 4 and the cap 3 then screwed down over the casing 1, which forces the neck 7 of the cartridge 6 tightly against the ring 4, and so forms an air-tight joint between the cartridge 6 and the upper end of the casing 1. The lever 30 is then moved on the pivot 42 in the direction of the casing 1, which forces the sliding piece 31 inward, which causes the prongs 33 34 to slide on the inclines 24 25 and moves the rod or tube 13 inward. This causes the needle 10 to perforate the seal 8 in the end of the cartridge 6, so that the compressed air or gas passes out of the cartridge 6 and down the groove or grooves 11 in the needle 10. This operation having raised the valve 9 off its seat 19 the compressed air or gas is free to pass along the port 20 in the valve 9 to the port 21 in the stem 12 and from the latter to the hole 22 in the rod 13 and through the tube 37 to the tire. When the cartridge 6 is perforated, the air or gas is also free to pass through the port or passage 16 to the under side of the valve 9, which places the valve 9 in equilibrium. When the tire has been sufficiently inflated, the lever 30 is released and the pressure of the air or gas remaining in the cartridge 6 and casing 1 acts on the piston 14 and cup-leather 15 and forces the valve 9 down onto its seat on the ring 19, and so closes the port 20 and prevents the passage of any more air or gas to the tire. The air or gas not utilized for inflating the tire is thereby retained in said cartridge 6 and casing 1, wherein it is stored for future use.

What we claim as our invention, and desire to protect by Letters Patent, is—

1. In an apparatus for inflating rubber tires by means of a cartridge containing compressed air or gas, means for releasing air or gas and conducting it to the tire to be inflated, said means comprising a needle adapted to perforate the cartridge to release the air or gas and a valve through which the air or gas may pass to the tire to be inflated, means for raising said valve and causing the needle to perforate the cartridge, and means whereby the valve is closed when the means which serve for opening it are released, to allow a portion only of the contents of the cartridge to be utilized.

2. In means for inflating rubber tires by means of cartridges containing compressed air or gas, the combination of a casing adapted to receive the cartridge, a valve seated in said casing, a needle fitted to said valve adapted to perforate the cartridge to release the air or gas when the valve is raised off its seat, a port in the valve for conducting the compressed air or gas to the tire to be inflated, and a piston formed on part of the valve which operates to close the valve when the pressure maintaining the valve in an open position is released, substantially as described.

3. In means for inflating rubber tires by means of cartridges containing compressed air or gas, comprising a casing adapted to receive the cartridge, a valve formed with a stem and seated in said casing, a needle fitted to said valve adapted to perforate the cartridge to release the air or gas when the valve is raised off its seat, a port through the valve and stem, a rod or tube into which the stem of the valve is fitted, a cup-leather between said stem and rod forming a piston, a lever for moving said rod inward to open the valve and to perforate the cartridge and a port through the valve through which the compressed air or gas may pass to act on the piston to close the valve when the valve is released, and means for conducting the air or gas from the casing to the tire to be inflated, substantially as described.

4. In means for inflating rubber tires, in combination, a cartridge containing compressed air or gas fitted with a perforatable seal at one end, a casing fitted with a resilient ring adapted to receive the end of said cartridge, a cap screwed over the end of the casing to secure the cartridge in position in said resilient ring, a valve located in said casing and a resilient ring forming a seat for said valve, a needle fixed to said valve adapted to perforate the seal in the end of the cartridge, said needle being formed with grooves to permit of the escape of the air or gas from the cartridge when the needle penetrates it, a stem formed on the valve provided with a piston or annular enlargement and with a screw-thread, a rod or tube located in the casing into which the extremity of the stem is screwed, a cup leather or packing located round the piston inside the casing, a port which is closed by the valve, said port communicating with a hole or port formed through the stem and with a hole or passage formed through the rod or tube, a further port formed through the valve which allows the air or gas when released to act on the piston, an enlargement or boss formed on the tube provided with inclines and a guiding pin or screw working in a groove in the casing, a lever pivoted to the casing and a slide pivoted to the lever which operates to move the tube inward to open the valve and at the same time to cause the needle to perforate the cartridge, a bush screwed into the end of the casing for closing the latter and forming a guide for the tube operating the valve, and a flexible tube fitted to the end of said tube for conducting the compressed air or gas to the valve of the tire to be inflated, substantially as described and shown.

5. In an apparatus for inflating rubber tires by means of a cartridge containing compressed air or gas, a holder for a cartridge of the kind mentioned, a needle for perforating said cartridge to release the air or gas, a handle for causing perforation of the cartridge by the needle, a valve, operated by the handle aforesaid, through which the air or gas may pass to the tire to be inflated, and means to allow a portion only of the contents of the cartridge to be utilized.

6. In an apparatus for inflating rubber tires by means of a cartridge containing compressed air or gas, a holder for a cartridge of the kind mentioned, a needle for perforating said cartridge to release the air or gas, a handle for causing perforation of the cartridge by the needle, and a valve, operated by the handle aforesaid, to allow a portion only of the contents of the cartridge to be utilized.

In witness whereof we have hereunto set our hands in the presence of two subscribing witnesses.

ALFONSO GEORGE LAVERTINE.
JAMES EDWARD McNELLAN.

Witnesses:
  CHAS. OVENDALE,
  R. OVENDALE.